Nov. 3, 1925.

H. N. SCHRAMM

SELF LUBRICATING CONNECTING ROD

Filed July 10, 1923

1,559,918

INVENTOR

Henry N. Schramm

BY

ATTORNEY.

WITNESS:

Patented Nov. 3, 1925.

1,559,918

UNITED STATES PATENT OFFICE.

HENRY N. SCHRAMM, OF WEST CHESTER, PENNSYLVANIA.

SELF-LUBRICATING CONNECTING ROD.

Application filed July 10, 1923. Serial No. 650,579.

*To all whom it may concern:*

Be it known that I, HENRY N. SCHRAMM, a citizen of the United States, and a resident of West Chester, in the county of Chester and State of Pennsylvania, have invented certain new and useful Improvements in Self-Lubricating Connecting Rods, of which the following is a specification.

This invention relates to lubricators or oiling devices, and particularly to method and means for the lubrication of the bearings at the opposite ends of a connecting rod of an engine.

One of the objects of my invention is to make a self-lubricating connecting rod.

A further object is a connecting rod adapted to convey a lubricant to the bearings at its opposite ends without splashing or otherwise wasting the lubricant.

A further object is to supply a lubricant to a self-lubricating connecting rod from a stationary source of supply.

A further object of my invention is a method for lubricating the bearings at the opposite ends of a connecting rod by means of a conveyor carried by the rod and adapted to absorb a lubricant from a stationary source of supply and to transfer the lubricant by gravity to the bearings.

With the above and related objects in view, my invention comprises the method and means hereinafter described, an embodiment whereof is illustrated in the accompanying drawing, and is embraced within the scope of the appended claims.

In the said drawing—

Figure 1:
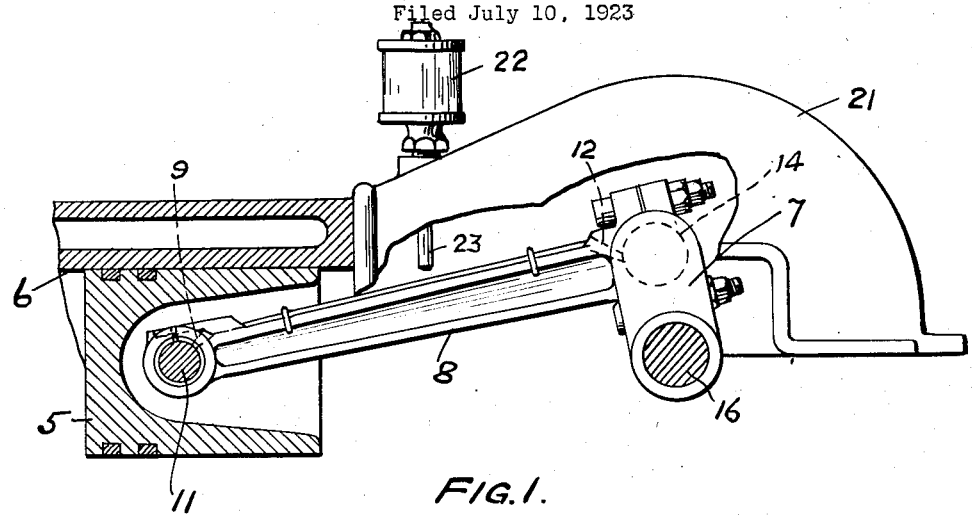
Fig. 1, is a partial elevation of an engine provided with my self-lubricating connecting rod.
Figure 2:
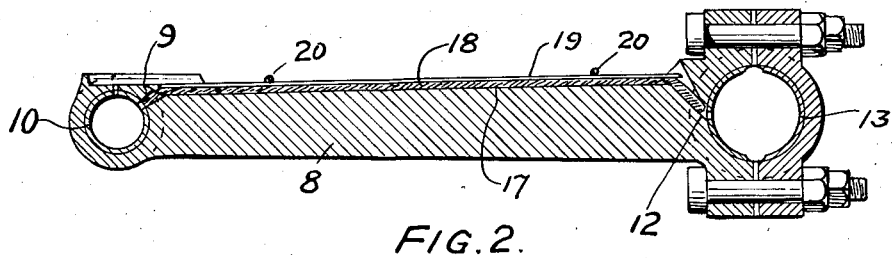
Fig. 2, is a sectional side elevation of the rod.
Figure 3:
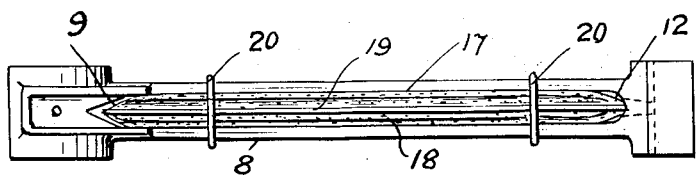
Fig. 3, is a plan view of the rod.
Figure 4:
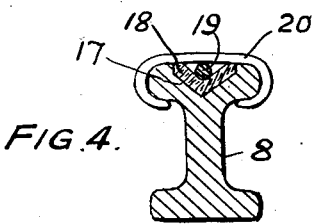
Fig. 4, is a central section of Fig. 3.

Referring more particularly to the drawing for a detail description of my invention, 5 represents the piston of an engine, such as an internal combustion engine, mounted to reciprocate in a straight line in a cylinder 6. A crank 7 adapted to rotate a fly wheel (not shown) is connected by a rod 8 with the piston 5 to convert the straight line movement of the piston into the rotary movement of the crank. The connecting rod is provided at its piston end with a bore having an oil hole 9 registering with the oil hole of a bushing 10. The rod is further provided at its crank end with a bearing box having an oil hole 12 registering with that of a bearing 13. The rod is mounted at its piston end on a pin 11 of the piston and at its crank end it is mounted on the pin 14 of the crank which rotates the shaft 16.

For the purpose of lubricating the bushing and bearings and their respective pins, the connecting rod is provided on top with a channel or groove 17 running longitudinally of the rod and connecting the oil holes at its opposite ends. The groove 17 is lined with a wick 18, held in proper alignment by a rod 19, which is in its turn held in position by clamps 20.

The groove 17 is connected with the oil holes on the same level, and are given a downward inclination to discharge the lubricant at a lower level, to prevent the accumulation of the lubricant in the groove.

The stationary guard 21 is provided with an oil cup 22 in position to discharge a lubricant, such as lubricating oil, through a tube 23 centrally above the connecting rod, the free end of the tube being as close as possible to the rod, leaving just enough clearance for the rod to oscillate freely without striking the tube.

The lubricant which flows from the cup 22 enters the groove 17 where it is absorbed by the wick 18, and when the rod oscillates the lubricant is caused by gravity to flow through the oil holes 9 and 12 and to be distributed between the bushing 10 and its pin 11 and between the bearing 13 and its pin 14.

It will be readily understood that since the oil cup is stationary and in proper alignment with the groove of the connecting rod all of the lubricant will enter the groove to be immediately absorbed by the wick, so that there will be no splashing and no waste of the lubricant, which ordinarily results when the rod oscillates and vibrates.

What I claim is—

1. A self oiling connecting rod, bearings at the opposite ends thereof, a channel or groove on top of the rod running lengthwise thereof, oil holes at the opposite ends of the groove, a stationary oil cup above the rod adapted to continuously discharge a lubricant into the groove, said oil holes having their intakes on a level with the groove and their outlets at a level below the groove.

2. The combination claimed in claim 1, including a wick lining the groove adapted to absorb the lubricant, said wick being connected with the oil holes to discharge the lubricant therethrough.

3. A self oiling connecting rod, bearings at the opposite ends thereof, said rod provided longitudinally with a groove, oil holes connecting the groove with the bearings, and a wick embedded in said groove between the oil holes, the ends of the wick being downturned where the groove connects with the said oil holes.

4. The combination claimed in claim 3, including clamping means to prevent the displacement of the wick and to hold it fixed lengthwise of the groove with its ends downturned at the oil holes.

5. The combination of a connecting rod, bearings at the opposite ends thereof, a shallow groove longitudinally of the rod, oil holes at the opposite ends of the groove penetrating the bearings, a wick embedded in the groove, and means holding the wick down the groove.

6. The combination claimed in claim 5, and a stationary oil cup above the groove and intermediate the oil holes in position to supply the wick with a lubricant.

In testimony whereof I have attached my signature to this specification.

HENRY N. SCHRAMM.